May 6, 1941.  P. D. HAMMOND ET AL  2,240,962
SEPARATION OF ORTHO AND PARA CHLORTOLUENES
Filed Sept. 10, 1938
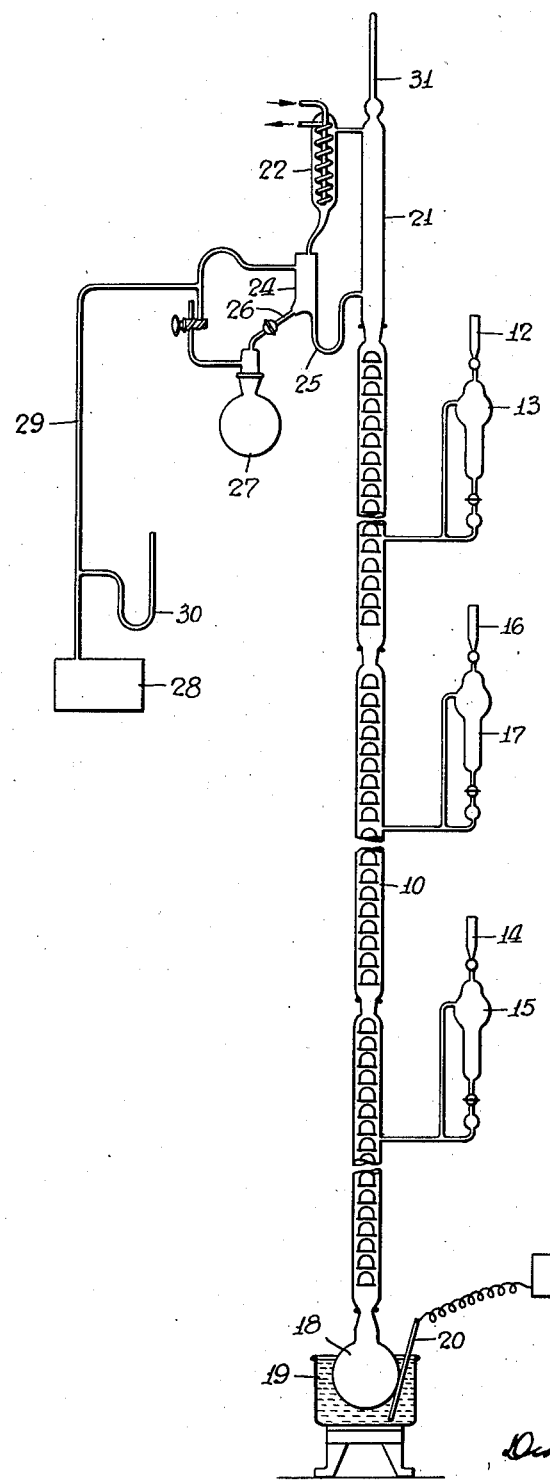
INVENTORS
*Philip D. Hammond
Robert W. Harris*
BY
*Dean Fairbank & Hirsch*
ATTORNEYS Patented May 6, 1941

2,240,962

UNITED STATES PATENT OFFICE 2,240,962

SEPARATION OF ORTHO AND PARA CHLORTOLUENES

Philip D. Hammond, Metuchen, and Robert W. Harris, Raritan Township, Middlesex County, N. J., assignors to Heyden Chemical Corporation, New York, N. Y., a corporation of New York Application September 10, 1938, Serial No. 229,340

9 Claims. (Cl. 202—41)

In the usual commercial methods of manufacturing monochlortoluene by the chlorination of toluene, there results a mixture of monochlortoluene, dichlortoluene, and polychlortoluenes, as well as some unreacted toluene. It is comparatively easy to separate the monochlortoluene from the other ingredients of the reaction product by distillation. The monochlortoluene is usually composed of isomers including about 60% of the ortho, about 40% of the para, and a negligible amount of the meta.

Both the ortho and para are important intermediates for the production of other compounds, but for certain compounds one can use only the ortho, and for others, one can use only the para. Due to the fact that the difference between the boiling points of the ortho and para isomers is only about 3° C. (159.2° C. for the ortho and 162.4° C. for the para) the direct separation of the two by fractional distillation has, so far as we are advised, never been effected in commercial practice. Many well known investigators have stated that the separation of these two isomers by fractional distillation is impossible.

In U. S. Patent to Wahl 1,596,325 he says:

"The constituents of the mixture thus obtained cannot be separated by physical processes. The boiling points of the isomers are too close together to allow of fractionation even by the most improved apparatus, and separation by crystallization is impracticable since the orthochlorotoluene has a very low melting point (−34°). Owing to these difficulties ortho-chlorotoluene, which is a parent material of great importance, has always been made technically either by synthetic methods or by indirect methods."

Wahl proposed to separate the ortho and para isomers by selective sulfonation, hydrolysis, and crystallization.

Davidson in his book, "Intermediates for Dyestuffs" (1926) page 126, says, in reference to the chlorination of toluene and the formation of the mixture of ortho and para chlortoluenes:

"On fractionating the product, a mixture of the two monochlortoluenes can be isolated, but they cannot be separated from one another by distillation owing to the closeness of their boiling points."

L. Gindraux—Helv. Chim. Acta 12 921 (1929) states, (page 922):

"The separation thru distillation is not feasible"

On page 925, he states:

"The separation of the two isomers is only possible according to German Patent 376,634 thru the sulfonation of the ortho chlortoluene."

Grignard's Traite de Chimie Organique, vol. IV (1936) page 574, describes the separation of the two isomers by the action of sulfuric acid. As indicating that the separation is not feasible by either distillation or sulfonation, it is noted that a comparatively large number of patents have been granted and articles published dealing with the preparation of ortho and para chlortoluene by various synthetic methods.

Ullmann's "Enzyklopadie der Technischen Chemie" (vol. 10, page 27, 1932) gives specific methods for preparing ortho chlortoluene by the Sandmeyer reaction.

Cain & Thorpe's "Synthetic Dyestuffs," 7th edition (1933) page 55, gives only indirect methods for the preparation of these two isomers.

Swiss Patent 136,906 prepares them through the toluidenes. The chlorination of para toluene sulfonic acid or chloride followed by hydrolysis of the sulfonic acid group is described in German Patents 77,883 and 294,638, and also in an article by McMasters in J. I. E. C., vol. 23, pages 218 and 219 of 1931. Various processes for separating the aldehydes and acids derived from the chlortoluenes have been developed and patented. In German Patent 98,229, selective sulfonation of the ortho chlorbenzaldehyde is employed to separate it from the para compound. In German Patent 102,745, selective nitration of the ortho chlorbenzaldehyde is used for a similar separation. In German Patent 207,157, there is employed a fractional distillation combined with fractional crystallization to separate the chlorbenzaldehydes. The separation is effected in the acid stage in U. S. Patents 1,878,463; 1,882,335; and 1,942,826. If the industry had known of any method of direct separation of these isomers, it would not have been necessary to resort to such methods of chemical separation.

As previously noted, the difference in boiling points of the ortho and para chlortoluenes at atmospheric pressure is only about 3°. At progressively lower temperatures the vapor pressures come closer together. For instance, at 160° C. which is between the boiling points of the two isomers, the vapor pressure of the ortho is 776 mm. and the vapor pressure of the para is 713 mm., a difference of 63 mm. At 100° C. the vapor pressure of the ortho is 127 mm. and the vapor pressure of the para is 111 mm., a difference of only 16 mm. At 40° C. the vapor pressure of the ortho is 8.4 mm. and the vapor pressure of the para is 6.8 mm., a difference of only 1.6 mm.

In spite of the small difference in the boiling points and the fact that the vapor pressures come closer together at lower temperatures, we have discovered that there are certain conditions under which the two isomers may be separated by distillation. We have found that if the distillation be conducted at a pressure sufficiently reduced below that of the atmosphere, we can effect the separation of either or both of the isomers in a high state of purity. Preferably we employ a fractionating column with a reflux of a large portion of the condensate.

In the accompanying drawing, there is shown diagrammatically and merely for illustration an apparatus which may be used in the laboratory for carrying out our process. Obviously, the details shown are not those which would be employed in plant size commercial operation. In the drawing there is shown a column 10 broken in several places to indicate that the number of plates employed would be very much larger than the number illustrated.

The mixture of ortho and para chlortoluene may be delivered through an inlet 12 and feed reservoir 13 entering the column between the fifteenth and sixteenth plates from the top if it is desired to produce pure para chlortoluene. The mixture may be delivered through an inlet 14 and feed reservoir 15 to the column between the fifteenth and sixteenth plates from the bottom if it is desired to obtain pure ortho chlortoluene. The feed may be through an inlet 16 and feed reservoir 17 entering between the sixtieth and sixty-first plates of the column if the column have 120 plates, and if it is desired to obtain both the ortho and para chlortoluene each in a substantially pure state.

The column may be connected to a still 18 at the bottom having any suitable means for heating it as for instance, an oil bath 19 and suitable means for determining and controlling the temperature as for instance, through a thermocouple 20. At the top of the column the vapors may rise through a section 21 and pass into a condenser 22 from which the condensate will collect in a receiver 24. From this receiver a portion may return to the upper end of the column through a pipe 25 and a portion may be drawn off through a valve controlled pipe 26 through a collecting chamber 27. The receiver 24, the chamber 27 and the column may be maintained at the desired low pressure by a vacuum pump 28 connected through a pipe 29 and having a monometer or other indicating apparatus whereby the operator may determine the degree of vacuum at the head of the column and make adjustment for maintaining the desired degree of vacuum. By closing the valve in the pipe 26, all of the condensate may be returned to the upper end of the column as reflux, and by opening the valve to the desired extent the relative proportion of condensate going back to the column and that going to the chamber 27 may be controlled. The temperature at the upper end of the column may be ascertained by a thermometer 31 and the temperature at the bottom of the column regulated accordingly.

Where it is desired to obtain substantially pure ortho chlortoluene and a mixture of the isomers from a monochlortoluene containing about 60% of the ortho compound, the following procedure is given as an example: A pressure of approximately 55 mm. absolute is employed at the top of the fractionating column and a reflux condenser at the top is operated to give a reflux ratio of about 20:1. The column is provided with 120 plates with a pressure drop of 0.8 mm. per plate giving a still pressure of about 150 mm. absolute and the feed is at the 15th plate from the bottom. By the use of such apparatus ortho chlortoluene of 99.5% purity may be taken off at the top of the column and the residual liquid at the bottom of the column will contain about 45% to 50% of the ortho compound.

Where it is desired to obtain substantially pure para chlortoluenes and a mixture of the isomers from monochlortoluenes containing 60% of the ortho compound, the following procedure will serve as an example: A pressure of approximately 35 mm. absolute is maintained at the top of the column, with a reflux ratio of about 20:1. The column has 120 plates with a pressure drop of 0.8 mm. per plate, giving a pressure of 131 mm. absolute in the still, and the feed delivered 15 plates from the top. Thus there may be obtained a yield of para chlortoluene with a purity of 99% from the bottom of the column and the liquid withdrawn from the top will contain approximately 75% of the ortho compound.

For obtaining 90% pure ortho at the top and 90% para at the bottom, we may employ an absolute pressure of 50 mm. at the top, use 140 plates with a pressure drop of 2 mm. per plate, giving a still pressure of 330 mm. absolute and feed at the 70th plate.

To obtain pure ortho and pure para chlortoluene by fractional distillation of a mixture of 60% ortho and 40% para under vacuum, the apparatus may include two columns of 100 plates each with an applied pressure of 200 mm. absolute at the top. With a pressure drop of 2 mm. per plate, the pressure in each still will be 400 mm. An intermediate pump may be employed between the columns to deliver liquid from the bottom of the second column to the top of the first. With such an apparatus and with such pressures, a yield of para chlortoluene of 99% purity at the bottom of the first column, and a yield of ortho chlortoluene of 99.5% purity at the top of the second column may be obtained. Each column is provided with a reflux condenser with a reflux ratio of approximately 20:1 on the second column. The feed may be at or near the top of the first column or at or near the bottom of the second column, depending upon the percentage of the two isomers in the feed. Vapors withdrawn from the top of the first column by the action of the partial vacuum may be condensed and then revaporized and returned to the second column near the bottom.

The foregoing are given merely as examples, as various changes may be made in the details of the apparatus and the other factors employed. For instance, if a lesser degree of purity is required in any of the examples above given, a smaller number of plates may be employed. For instance, in obtaining ortho chlortoluene under the first example, a reduction of 30 plates will give a purity of about 97½% instead of 99½%. Decreasing the number of plates decreases the purity, and decreasing the reflux ratio likewise decreases the purity. The minimum reflux ratio should be not less than 12½:1 for a purity of 99½%, but for a purity of only 98% which may be considered substantially pure the reflux may be as low as 10.6:1. A greater reflux ratio than 20:1 will give greater purity but will reduce the output of the apparatus. A higher reflux ratio likewise permits a reduction of the number of plates. An increase in pressure ordinarily necessitates an increase in the reflux ratio.

Where a purity of less than 99% of either or both isomers is all that is required, or where a very much larger number of plates are employed in the column, the applied pressure may be above 200 mm. absolute, and under some conditions, pressures as high as 475 to 500 mm. may be used but with a large increase in the reflux ratio.

In the examples given, it has been assumed that the column contains plates having the specified pressure drop per plate. If the pressure drop per plate be less, a smaller number of plates may be used, and if the pressure drop per plate be greater, then a larger number of plates must be used. Increasing the reflux ratio will necessarily increase the pressure drop per plate for a still column of a given size and with a particular type of plate.

The limit of possible operation for obtaining a purity of 98% is a reflux ratio of at least 10.6:1, a pressure of not to exceed 200 mm. absolute and the equivalent of at least 45 plates. When any one of these factors is employed at said limit, the other factors cannot be at their respective limits but must be well within them.

We have referred to the use of apparatus including a plurality of plates in the fractionating column. Other types of fractionating apparatus may be employed and even those which do not include any plates but are so designed as to give the equivalent effect.

We have stated certain subatmospheric pressures used under certain conditions as to composition of the mixture, percentage of reflux, purity of product, etc. It is obvious that under other conditions, other subatmospheric pressures may be found to be most desirable.

Having thus described our invention, what we claim as new and desire to secure by Letters Patent is:

1. The process of treating a mixture of about 60% ortho monochlortoluene and about 40% para monochlortoluene to separate at least one of said ingredients of said mixture substantially free from the other ingredient, which includes continuously distilling the mixture in a column still having the equivalent of at least 45 plates under an applied pressure of not exceeding 200 mm. absolute, and with a reflux ratio of not less than 12½:1.

2. The process of treating a mixture of ortho and para monochlortoluene to separate at least one of said ingredients of said mixture free from the other ingredient, which includes continuously distilling the mixture in a column still having the equivalent of at least 45 plates, with reflux and an absolute pressure at the head of the column of 35 to 55 mm., an absolute pressure of 135 to 150 mm. in the still, and a reflux ratio of about 20:1.

3. The method of obtaining in a state of comparative purity one of the isomers of a mixture of approximately 60% ortho monochlortoluene and 40% para monochlortoluene, which includes continuously distilling the mixture in a column still having the equivalent of at least 45 plates with the pressure at the head of the column about 35 to 50 mm. absolute pressure, and with a reflux ratio of not less than 12½:1.

4. The method of obtaining comparatively pure ortho chlortoluene from a mixture of the same with para chlortoluene, which includes continuously fractionally distilling the mixture in a column still having the equivalent of at least 45 plates under an absolute pressure of about 55 mm., a reflux ratio of about 20:1, with the feed near the lower end of the column.

5. The method of obtaining comparatively pure para chlortoluene from a mixture of the same with ortho chlortoluene, which includes continuously fractionally distilling the mixture in a column still having the equivalent of at least 45 plates under an absolute pressure of about 35 mm., a reflux ratio of about 20:1, with the feed near the upper end of the column.

6. The process of treating a mixture of about 60% ortho chlortoluene and about 40% para chlortoluene to obtain at least one of said ingredients in a substantially pure state, which includes continuously delivering said mixture to the fractionating column of a still having the equivalent of at least 45 plates at a point adjacent to the end of the column farthest from that at which said ingredient is withdrawn, continuously distilling the mixture in said still, maintaining a pressure not exceeding 200 mm. absolute at the top of said column, condensing vapors at the top of said column, and maintaining a reflux ratio of not less than 12½:1.

7. The process of obtaining a substantially pure chlortoluene from a mixture of about 60% ortho chlortoluene and about 40% para chlortoluene, which includes maintaining a pressure of about 35 mm. to about 55 mm. absolute at the top of a fractionating column having about 120 plates with a pressure drop of about 0.8 mm. per plate, delivering said mixture to said column at about the 15th plate from one end, distilling mixture at the bottom of the column, maintaining a reflux ratio of about 20:1 at the top of the column, and withdrawing one of said chlortoluenes in a substantially pure state from the end of the column, opposite to that to which the mixture is delivered.

8. The process of treating a mixture of ortho and para chlortoluene to obtain at least one of a purity of at least 98%, which includes maintaining a pressure of not to exceed 200 mm. absolute at the top of a fractionating apparatus, said apparatus having the equivalent of at least 45 plates, delivering said mixture to said fractionating apparatus at a point intermediate of the ends of the latter, condensing and returning vapor to the end of the apparatus where said pressure is maintained, controlling the amount of condensate returned to maintain a reflux ratio of at least 10.6:1, withdrawing the at least 98% pure chlortoluene from the end of the fractionating apparatus farthest from the point of admission of the mixture, and withdrawing a mixture of said chlortoluenes from the other end of said apparatus.

9. The process of treating a mixture of ortho and para chlortoluene to obtain at least one of a purity of at least 99½%, which includes maintaining a pressure of not to exceed 200 mm. absolute at the top of a fractionating apparatus, said apparatus having the equivalent of at least 45 plates, delivering said mixture to said fractionating apparatus at a point intermediate of the ends of the latter, condensing and returning vapor to the end of the apparatus where said pressure is maintained, controlling the amount of condensate returned to maintain a reflux ratio of at least 12½:1, withdrawing the at least 99½% pure chlortoluene from the end of the fractionating apparatus farthest from the point of admission of the mixture, and withdrawing a mixture of said chlortoluenes from the other end of said apparatus.

PHILIP D. HAMMOND.
ROBERT W. HARRIS.